No. 892,569. PATENTED JULY 7, 1908.
G. E. WHITNEY.
FUEL BURNING APPARATUS FOR MOTOR VEHICLES.
APPLICATION FILED FEB. 18, 1901.

Witnesses:

Inventor:
George E. Whitney,
by
Atty.

No. 892,569.  
G. E. WHITNEY.  
FUEL BURNING APPARATUS FOR MOTOR VEHICLES.  
APPLICATION FILED FEB. 18, 1901.

PATENTED JULY 7, 1908.

Witnesses:

Inventor:  
George E. Whitney,

No. 892,569. PATENTED JULY 7, 1908.
G. E. WHITNEY.
FUEL BURNING APPARATUS FOR MOTOR VEHICLES.
APPLICATION FILED FEB. 18, 1901.

Witnesses:
Walter E. Lombard
A. E. Chesley

Inventor:
George E. Whitney,
by
Atty.

No. 892,569. PATENTED JULY 7, 1908.
G. E. WHITNEY.
FUEL BURNING APPARATUS FOR MOTOR VEHICLES.
APPLICATION FILED FEB. 18, 1901.
6 SHEETS—SHEET 4.

Fig. 6.

Witnesses:
Walter E. Lombard.
A. E. Chesley.

Inventor:
George E. Whitney,
by Maurice L. Emery
Atty

No. 892,569. PATENTED JULY 7, 1908.
G. E. WHITNEY.
FUEL BURNING APPARATUS FOR MOTOR VEHICLES.
APPLICATION FILED FEB. 18, 1901.
6 SHEETS—SHEET 5.

Witnesses:
Walter E. Lombard
A. E. Chesley

Inventor:
George E. Whitney,
by Frederick L. Emery
Atty.

No. 892,569. PATENTED JULY 7, 1908.
G. E. WHITNEY.
FUEL BURNING APPARATUS FOR MOTOR VEHICLES.
APPLICATION FILED FEB. 18, 1901.

Witnesses:
Walter E Lombard
A. E. Chesley

Inventor:
George E. Whitney,
by Frederick L. Emery
Atty.

UNITED STATES PATENT OFFICE.

GEORGE E. WHITNEY, OF BOSTON, MASSACHUSETTS, ASSIGNOR, BY MESNE ASSIGNMENTS, TO STANLEY MOTOR CARRIAGE COMPANY, A CORPORATION OF MASSACHUSETTS.

FUEL-BURNING APPARATUS FOR MOTOR-VEHICLES.

No. 892,569.      Specification of Letters Patent.      Patented July 7, 1908.

Application filed February 18, 1901. Serial No. 47,723.

*To all whom it may concern:*

Be it known that I, GEORGE E. WHITNEY, a citizen of the United States, residing at Boston, in the county of Suffolk and State of Massachusetts, have invented an Improvement in Fuel-Burning Apparatus for Motor-Vehicles, of which the following description, in connection with the accompanying drawings, is a specification, like letters on the drawings representing like parts.

This invention in motor vehicle relates particularly to fuel burning apparatus wherein gasolene or other liquid fuel is employed for generating the steam or other fluid pressure by which the vehicle is propelled.

The various features of my invention will be best understood after a description of an apparatus made in accordance with the same, and will be particularly pointed out and claimed at the end of this specification.

In the embodiment of my invention selected for illustration herein and shown in the drawings, B is a part of a suitable boiler provided at its lower end with a water leg, B', surrounding or inclosing the fire-box or combustion chamber C.

Figure 7:
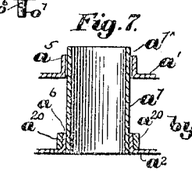
Fig. 7 is an enlarged detail in section, showing a formation of one of the burner tubes.

Within the combustion chamber is arranged a suitable burner apparatus, the same composed as herein shown of a conical side wall, $a$, with top and bottom plates, $a'$, $a^2$, forming between them one or more mixing chambers, D. The top and bottom plates, $a'$, $a^2$, of the burner are connected by the separate burner devices shown in section, Figs. 3, 5 and 7. Referring to these figures, the top plate, $a'$, is provided with a series of apertures formed by flanging the metal of the plate upwardly to form a series of ring-like flanges, $a^5$. The bottom plate, $a^2$, is provided with similarly arranged apertures, similarly formed, to leave upwardly extended ring-like flanges, $a^6$, preferably, however, slightly smaller in diameter than the diameter of the ring-like flanges, $a^5$, of the top plates. Air tubes, $a^7$, are inserted from the bottom through corresponding apertures in the two plates, as shown in Fig. 7, said tubes being expanded, as by a tube expander, into firm and permanent contact with the inner faces of the flanges $a^6$, which thereby act to hold the said air tubes firmly in position with their upper ends extending upwardly through the apertures in the top plates, as shown, the upper ends of said air tubes for the best results projecting slightly above the level of the surrounding flanges, $a^5$. The said air tubes are also separated from the surrounding flanges, $a^5$, to leave ring-like air spaces, $a^{7\times}$, due to the difference in diameters between the exteriors of the air tubes and the interiors of the flanged apertures in the top plates. Reinforcing rings, $a^{20}$, are preferably employed surrounding the ring-like flanges, $a^6$, and supporting the latter and the air tubes, $a^7$, that are expanded against the interiors of said rings. This construction leaves uninterrupted annular spaces through which gas admitted to the interior of the burner may escape and thoroughly mix with the air drawn upwardly within the air tubes from beneath the burner, thus furnishing a much more complete and effective combustion, and acting more efficiently to draw the air upwardly through the inclosed air tubes than do constructions where the gas is projected around the air tube in ring-like series of separated jets.

Figure 6:
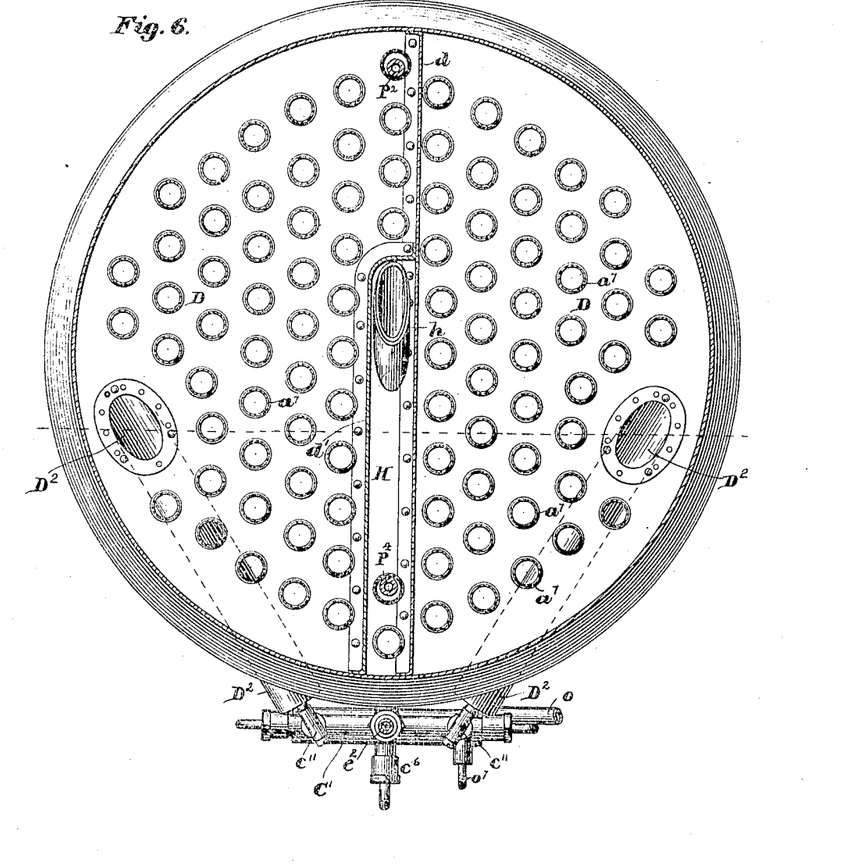
Fig. 6 is a horizontal section taken on the dotted line 6—6, Fig. 3, looking down.

The burner is divided interiorly and substantially diametrically by a wall, $d$, so that there are in effect two distinct but essentially similar mixing chambers, D, Fig. 6, each chamber having an inlet through a mixing tube or conduit, D². These mixing tubes, or conduits, D², Fig. 6, are divergently or radially arranged one with reference to the other, their entrance ends adjacent the distributing device being much closer together than their delivery ends, which, as shown, are located near the outer curved wall of the burner, whereby the gas entering through the tubes, as will be described, is projected into the chambers D, D, free of the burner devices therein in a direction which is both upward and tangential to the peripheral wall and against the top plates of the chambers. This causes the gas to be spread out in all directions, some of it spreading immediately to adjacent burner devices, the remainder following around the free spaces adjacent the curved walls of the chambers, thereby quickly reaching the burner devices located in the more remote parts of the chambers. Greater uniformity in the several jets issuing around the several air tubes in the chamber is thus obtained than would be possible were the said tubes to deliver the gas near the less free middle or inner portions of the chambers, where its passage to the various burner devices would be at once interrupted by the many air tubes or obstructions with which the middle portions of the chambers are filled. In actual practice I have found this arrangement of conduits or tubes for delivering the gas to the interior of the burner to be of the greatest value, since the more uniform combustion obtained throughout the entire area of the top of the burner adds greatly to the efficiency of the burner and the facility with which steam is generated and maintained.

Figure 3:
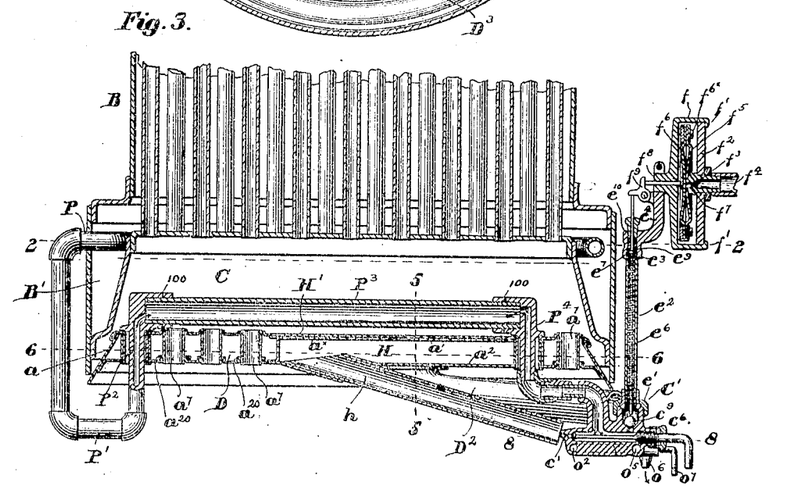
Fig. 3 is a vertical section taken on the dotted line 3—3, Fig. 2, with a part of the piping shown in elevation.

Arranged substantially diametrically through the middle of the burner, Figs. 3 and 6, is what I call a torch chamber, H, Fig. 6, one side of which is shown formed by the division wall, d, Fig. 6, and the other by a second wall, d', Fig. 6. This torch chamber has its own independent inlet or mixing tube, h, shown as arranged on an incline leading from a point below the burner upwardly through the bottom of the torch chamber, terminating preferably as shown in Fig. 3, the top plate, a', within the area of this chamber H being finely perforated, as at H', to permit the escape of the gas entering the said chamber through said tube h. The top plate, a', immediately over the discharge end of the mixing tubes, D², is also provided with fine perforations, D³, to permit escape of a part of the gas entering the chambers D through said tubes D².

I have applied to the top plate, a', within the area occupied by the fine perforations, H' and D³, reinforcing or thickening plates, $a^{\times}$ (shown best in Figs. 3 and 5), or said plates may be otherwise thickened within the areas mentioned, whereby the perforations through the said plate at these points are made in effect so many long passages of such small diameter as compared with their length that the flame will not draw back through them. In other words, I have found by experiment that a flame is apt to light back or draw through perforations, if the wall containing the said perforations is thin, but will not draw through such perforations if they are made of considerable length compared with their diameters, like small tubes or conduits. Lighting back is further guarded against by admitting the gas from the mixing tubes D² into the open, unobstructed areas of the chambers, D, as described, which avoids congestion near the mouths of said tubes and permits free distribution of the gas to all parts of the chambers. I have found by actual practice that a burner such as here described does not light back.

Figure 1:
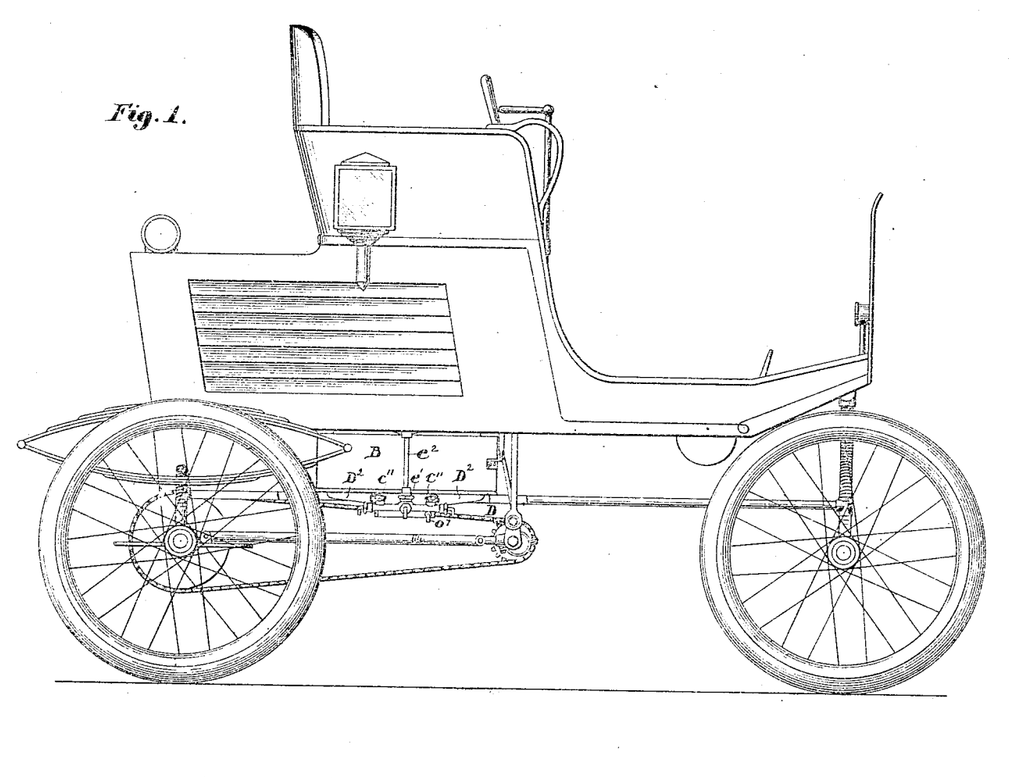
Figure 1, in side elevation, shows a typical motor-vehicle equipped with apparatus made in accordance with my invention.
Figure 2:
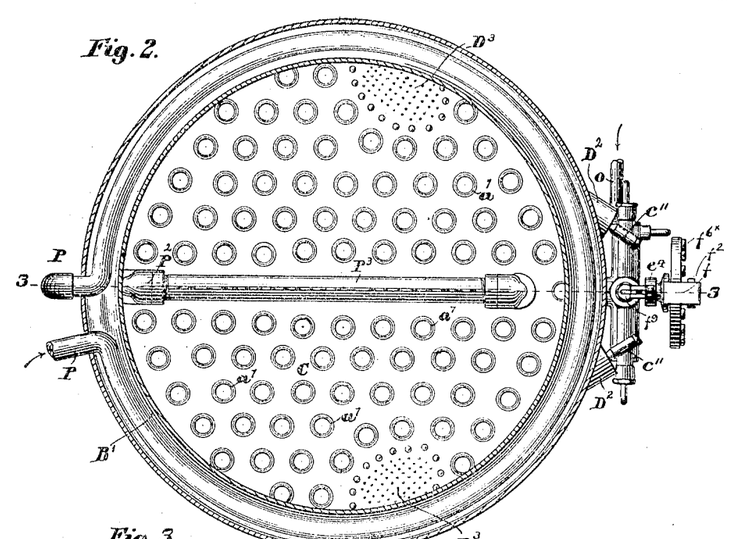
Fig. 2 is a horizontal section on the dotted line 2—2, Fig. 3, showing the burner, regulator and other of the parts, in plan view.

The oil or fuel taken from a usual source is here shown as entering through a pipe or conduit, P, Fig. 2, that is first given a turn around the combustion chamber and within the water leg surrounding the same, and, after it again leaves the boiler shell, is connected to a downwardly extended pipe, P', having an upturned end that rises loosely through a thimble, P², connecting the top and bottom plates of the burner, and enters one end of a retort, P³, that extends horizontally over the burner, in the line of the torch chamber, H, and close to the top of the said burner, as best shown in Fig. 3, so that the flame issuing from the torch chamber through the perforations, H', will heat the retort and its contained fluid.

The thimble, P², through which the retort pipe, P', rises in passing through the burner, is made enough larger than the said pipe to permit the latter to move back and forth with the expansion and contraction of the retort, the latter being preferably firmly held by the exit pipe at its opposite end, to be described. The ends of the retort, P³, are packed at 100, Fig. 3, to prevent leakage under differences in expansion and contraction between said retort and its end fittings.

I will now describe the distributing device indicated generally by C'. This distributer consists, as shown, of a body shown as a casting, having an inlet passage at its top and connected by a pipe, P⁴, with the adjacent end of the retort, P³, the fuel first entering the horizontal passage, c, Fig. 9. This passage c, terminates at its inner end in an orifice, c' that is directed upwardly into, and in line with, the axis of the torch mixing tube, h, as best shown in Fig. 3. The orifice, c', is under the control of a valve, c², the stem of which is threaded at c³, and screwed into a steel sleeve or holder, c⁴, splined within the casting of the distributer. The flanged outer end of the steel sleeve, $c^4$, is held normally in position by the yielding substance of the packing, $c^5$, confined by the usual threaded cap, $c^6$, through which the valve stem is extended, with its end down-turned to furnish means by which to rotate the stem and force the valve against or away from its seat, and thus close or open the said orifice, $c'$. The body is ordinarily made of composition, while the valve stem and valve are usually of steel, and if the valve stem were screwed directly into the body of the casting and the valve closed when the casting was heated, and the casting and stem thereafter permitted to cool, as at the termination of a run, the casting by contracting at a greater rate and further than the valve stem would contract upon the valve and its stem so tightly as to prevent subsequent opening of the valve to start the burner and also would be apt to injure the valve seat permanently. To obviate this I have provided the splined steel sleeve, $c^4$, within which the valve stem is threaded, and any difference in the rate of contraction of the casting and the valve stem is taken care of by the splined sleeve, which will slide as may be necessary to maintain the contact between the valve and the seat and yet not unduly press the one upon the other, the compressibility of the packing, $c^5$, acting as a yielding support to keep the valve always to its seat yet permit it to retract with the seat as the latter contracts in cooling.

Figure 4:
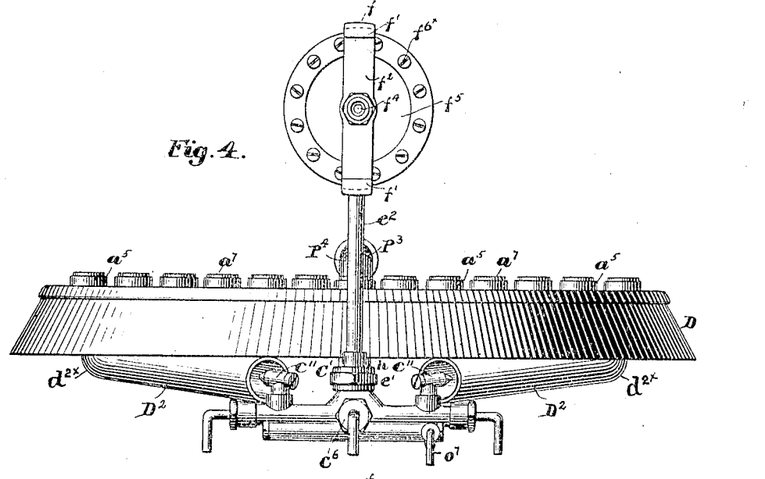
Fig. 4 is a side elevation looking from the right, Fig. 3, the parts being shown in this figure on an enlarged scale.
Figure 9:
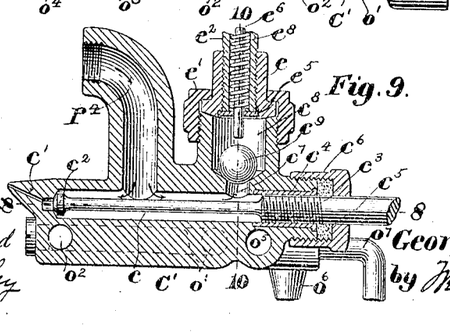
Fig. 9, a vertical cross-section on the dotted line 9—9, Fig. 8.
Figure 10:
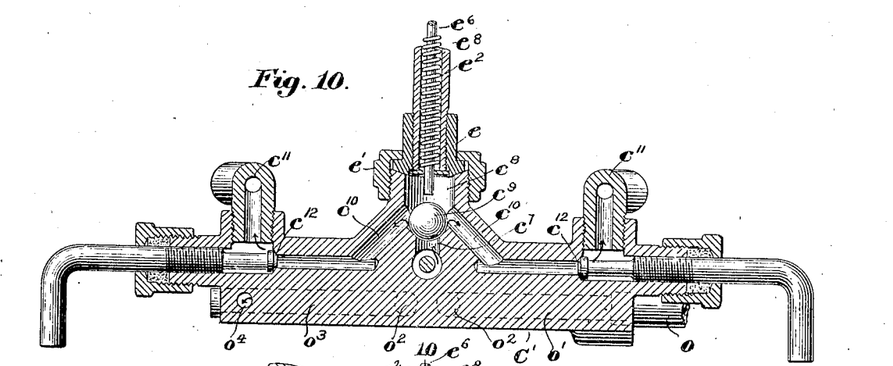
Fig. 10, a vertical longitudinal section on the dotted line 10—10, Fig. 9.
Figures 11, 12:
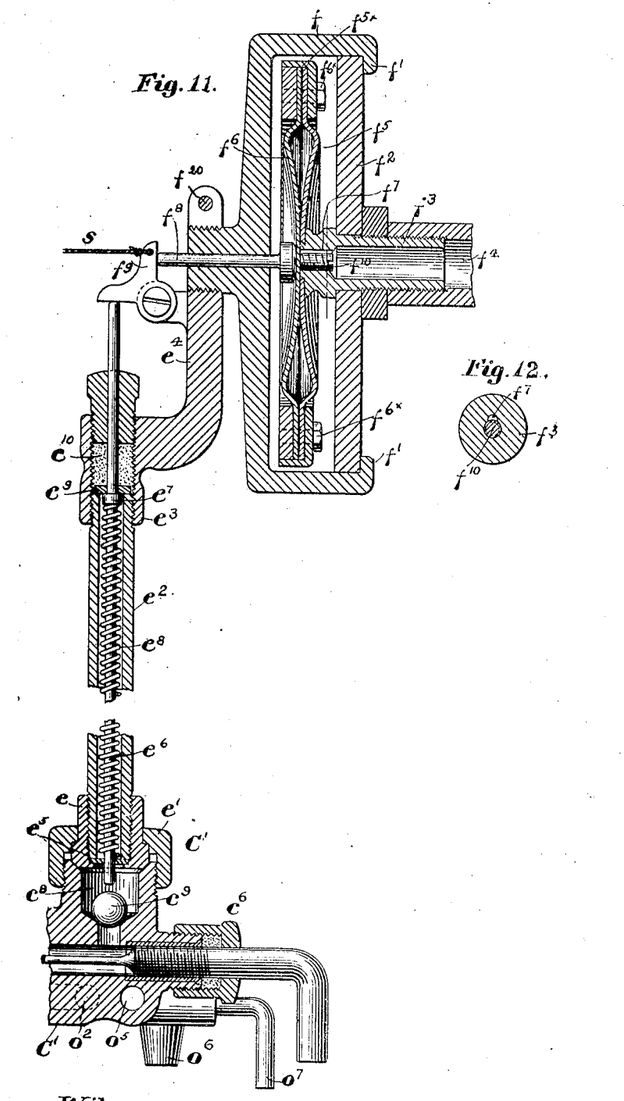
Fig. 11, an enlarged sectional view of the regulator, its regulating valve and the accessible connections between the same.

Referring now particularly to Figs. 2, 9 and 10: the horizontal passage, $c$, has an outlet, $c^7$, leading upwardly into a chamber, $c^8$, said passage, $c^7$, being controlled by a gravity ball valve, $c^9$, normally seated upon a conical seat surrounding the end of said passage. From this chamber, $c^8$, Fig. 10, two branch passages, $c^{10}$, lead downwardly and along to near the ends of the distributing device, thence upwardly again and into the discharge tips, $c^{11}$, Figs. 2, 4 and 10. These discharge tips, $c^{11}$, are axially in line with the mixing tubes, $D^2$, so that the said tips project the gas delivered thereby into and through the said tubes, thence into the mixing chambers of the burner. The passages $c^{10}$ leading to the tips, $c^{11}$ are respectively controlled by suitable valves, $c^{12}$, threaded in the ends of the body of the device and having their stems downturned, as shown in Fig. 10, to enable them to be rotated, as is necessary to open and close the said passages. The top of the ball valve chamber, $c^8$, Fig. 11, is closed by a fitting, $e$, clamped in position by an exterior coupling, $e'$. This fitting $e$ has screwed into it, one end of a tube, $e^2$, Figs. 10 and 3, the upper end of said tube being in turn screwed into a fitting, $e^3$, having an arm, $e^4$, that carries the diaphragm regulator, to be described. The fitting $e$ is counter bored at its lower end to receive a washer, $e^5$, secured in position by riveting over the wall of the counter-bore, as shown, and in a central opening in the washer, $e^5$, is arranged a valve stem or rod, $e^6$, that extends upwardly within the tube $e^2$, Fig. 3, and at its upper end has fastened upon it a collar, $e^7$, between which and the said washer, $e^5$, is interposed a spiral spring, $e^8$, surrounding the said valve stem, $e^6$. This spring acts normally to lift the valve stem, $e^6$, away from the ball valve, $c^9$, the limit of upward movement of the said stem being fixed by contact of the said collar, $e^7$, with a washer or disk, $e^9$, arranged between the upper end of the tube $e^2$ and the packing $e^{10}$, through which the extended end of the valve stem passes outwardly from the said tube, $e^2$.

Referring to Figs. 3 and 11, the arm, $e^4$, has screwed into it laterally the yoke, $f$, the arms of which have overturned ends, $f'$, that hold a cross-bar, $f^2$. This cross-bar, $f^2$, at its middle, holds a nipple, $f^3$, that is threaded at one end to receive the threaded end of a pipe, $f^4$, leading to the interior of the boiler or other holder of the controlling pressure, said nipple at its opposite end being brazed or otherwise firmly attached to a diaphragm plate, $f^5$. In the embodiment of my invention shown in Figs. 3 and 11, a second diaphragm plate, $f^6$, is opposed to the diaphragm plate $f^5$, the two being tightly clamped together at their peripheries, as by screw bolts, $f^{6\times}$, with an intervening packing, $f^{5\times}$, whereby a tight pressure chamber is formed between the said plates, into which leads an opening, $f^7$, Figs. 11 and 12, in the nipple $f^3$ and communicating with the pipe $f^4$. A small rod, $f^8$, is arranged in the yoke $f$, one end of the said rod resting against the diaphragm plate, $f^6$, the other end resting against one arm of a bell crank lever, $f^9$, the other arm of which bears upon the top of the extended end of the valve stem, $e^6$.

A set screw, $f^{10}$, Figs. 11 and 12, threaded in the nipple, $f^3$, and accessible from the exterior of the regulator when the pipe $f^4$ is uncoupled, bears at its inner end against the inner face of the diaphragm plate $f^6$, so that by setting up the screw, $f^{10}$, the diaphragm plates may be separated more or less to thus set the diaphragm, as it were, to a given tension equivalent to a given pressure below which the pressure admitted to the chamber between them will have no effect in separating them; but the moment the contained pressure acts upon the diaphragm plates with greater pressure or effect than that exerted by the set screw, such pressure will then further separate the said plates, and through the rod, $f^8$ and bell crank $f^9$ depress the valve stem $c^9$ upon the top of the ball valve $c^9$ to hold the latter firmly against its seat for a purpose to be described.

Since the diaphragm plate $f^5$ is rigidly held by its nipple $f^3$, in the cross-bar $f^2$ of the yoke, any movement of said diaphragm is communicated through its periphery to the diaphragm $f^6$ and is thus added to the movement of the diaphragm $f^6$, the combined or cumulative movements of the two being expended in moving the rod $f^8$, and consequently the valve stem $e^6$, the result being that a very pronounced and quick movement is obtained when the given pressure is reached.

The resiliency of the diaphragm plates, that is, their inherent elasticity, is alone relied upon in the construction shown to oppose the controlling pressure admitted to the space between the diaphragms; consequently, the separation of said diaphragms under the action of the controlling pressure, is a constantly progressing movement,—the greater the pressure the more extended the movement. And the set screw, $f^{10}$, acts to set the diaphragms by first separating them or moving them progressively a given distance, and the controlling pressure, when it reaches the desired or predetermined point, acts also progressively to move the said diaphragm plates beyond the limits to which they were moved or separated by the adjusting of set screw.

As the diaphragms separate at their middles, their peripheries of course tend to contract in diameter or move inwardly and radially, and this radial movement of course takes place simultaneously and in unison with the outward movement of the middle portions of the diaphragms, and inasmuch as the peripheries of the two move radially together, one acting as a peripheral support for the other, and both together holding firmly between them the packing, $f^{5\times}$, it is clear that the packed peripheral joint between the two diaphragms is not disturbed in the least for there is no slip whatever or sliding movement between either diaphragm and its packing, the whole moving in unison as one structure;
so that the tendency to leak is reduced to a minimum and is practically *nil*. The holes in the peripheries of the diaphragms, Fig. 11, for the clamping screws, $f^{6\times}$, are enough larger than said screws to permit the peripheral movement of the diaphragm above described.

The operation of the apparatus thus far described is as follows:—viz., with the burner in operation, gasolene or other liquid fuel contained in the pipe P surrounding the combustion chamber is heated to a high temperature; it then passes through the pipe P′ to the retort P³, where it is further heated to an extremely high temperature. From the retort P³ the heated fuel flows down through the pipe P⁴ to the distributing device, where part of it issues as a gas through the orifice $c'$, and is projected thereby through the torch mixing tube $h$, Fig. 3, drawing with it the necessary quantity of air, with which it becomes mixed before its discharge into the torch chamber, where it supports the flame or combustion through the small perforations H′ in the top of said torch chamber. Another portion of the liquid fuel passes from the horizontal passage $c$, Fig. 9, in the distributing device up through the passage $c^7$, lifting the gravity ball valve $c^9$, thence divides and flows along the two passages $c^{10}$, Fig. 10, passing the valves $c^{12}$ to the tips $c^{11}$, through which it is projected as a gas diagonally upward into the mixing tubes D², Fig. 6, taking with it the required quantity of air to be mixed therewith and delivered into the mixing chambers D of the burner, as described. When the steam within the boiler reaches the required pressure, it acts through the diaphragm regulator described to depress the valve stem $e^6$ and positively seat the ball valve $c^9$ Figs. 9 and 10, thus cutting off the supply of liquid fuel to the two tips $c^{11}$ and correspondingly reducing the heating effect of the burner until the steam pressure, responding to the reduced heating effect of the burner, drops below the given point, when the diaphragm regulator, under the influence of such change of pressure, again permits the valve $c^9$ to lift for the passage of fuel once more to the tips, $c^{11}$. Thus the fluctuations in steam pressure automatically regulate the supply of fuel to the tips, $c^{11}$, whereby a substantially constant steam pressure is maintained. The diaphragm plates, $f^5$, $f^6$, herein are returned to their normal position, upon reduction in steam pressure solely by their own inherent elasticity or resiliency, and in practice I have found this device so sensitive that it will open and close the valve, $c^9$, under fluctuations in pressure that are not apparent upon the ordinary steam gage; so that, practically speaking, an absolutely uniform pressure is maintained within the boiler. The preliminary setting of the diaphragms at a given pressure, as described, below which the regulator does not respond, is of great value, since it prevents any fluctuations or movements whatever below the pressure at which the regulator is thus set, and when the regulator finally does respond, it is by an exceedingly quick and positive movement, so that the burner is maintained, as it were, wide open, until the checking pressure has been reached, when it is promptly and completely closed, and is again opened upon the slightest diminution in the required pressure.

Figure 8:
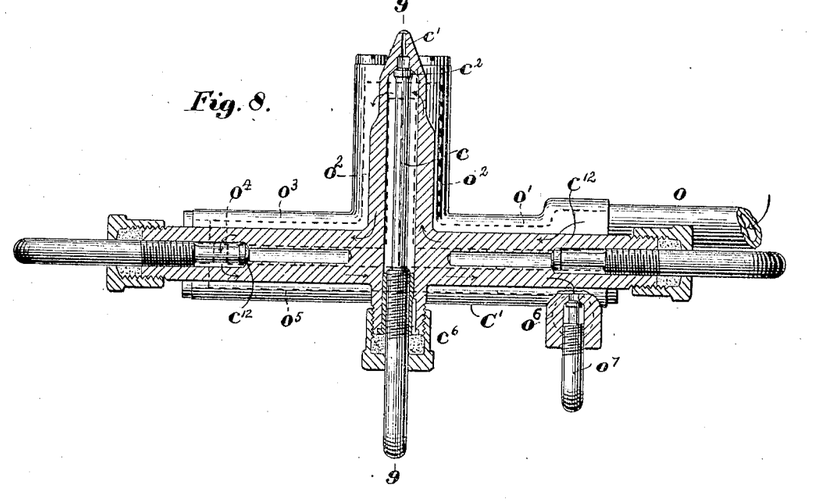
Fig. 8, a full sized detail of the discharge device of the distributer, the view being a horizontal section on the dotted line, 8—8, Figs. 3 and 9.

In starting the burner for the first time, it is desirable as a preliminary step, to heat the body of the distributer C′, so as to vaporize the liquid fuel first delivered to it. For this purpose, I have provided a steam pipe, $o$, suitably connected with the boiler and entering the distributer C', at a suitable point (best shown in Figs. 8 and 10), where it communicates with a passage, $o'$ (shown in dotted lines Figs. 8 and 10), and follows along the casting to about the middle thereof, where it turns and makes a loop, $o^2$, to one side substantially under and along the portion of the casting that contains the passage $c$, and orifice, $c'$ (see the dotted lines, Fig. 8, and full lines, Figs. 9 and 10), said passage thereafter continuing on, at $o^3$, to the further end of the said casting, where it turns upon itself, at $o^4$, see Fig. 9, and returns, at $o^5$, to the same end of the casting at which it entered, said passage at its outlet end terminating in a downwardly extended nozzle, $o^6$, under the control of a valve, $o^7$, Fig. 9. To start the burner, the valve $o^7$ is opened, and the circulation of steam is thus established through the train of passages thus described, the presence of the steam acting to heat the body or casting as a whole, so that when oil is admitted to the torch orifice, $c'$, Fig. 9, it is immediately vaporized by the heat of the casting and projected into the torch tube and ignited beneath the retort, thus heating the whole volume of oil within the retort on its way to the distributer, so that the temperature of the fuel itself thereafter is sufficient to maintain the casting sufficiently hot, without requiring the continued use of steam. The distributed steam for thus heating the distributer casting may be obtained from some extraneous source, or, in cases where the vehicle is temporarily stopped and the burners extinguished for a short time, as when the operator is making a call or stops in his run for a short time, the boiler will retain sufficient steam for a length of time sufficient to again heat the distributer in the manner described when it is desired again to start the vehicle. If no steam is at hand for heating the casting, it may be otherwise heated, as by a torch, or an alcohol flame, or something of the sort, as is common in burners of this type as at present employed.

Figure 5:
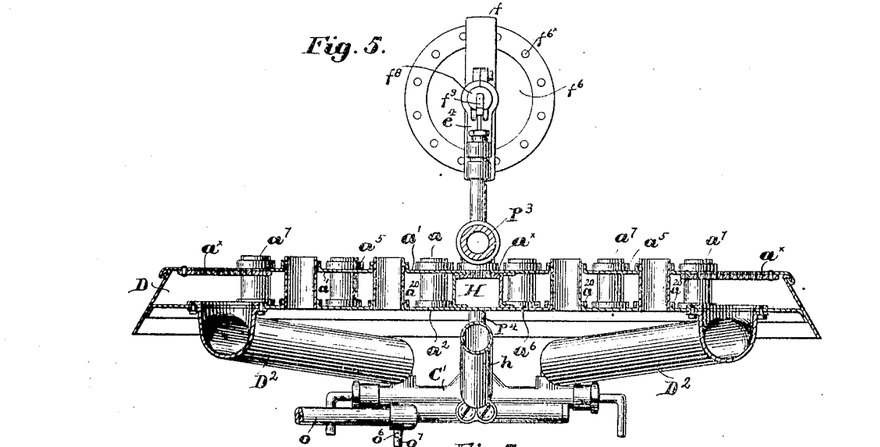
Fig. 5 is a vertical cross-section of the burner, Fig. 3, the section being taken on the dotted line 5—5 looking toward the right.

In the diaphragm regulator described and shown in Figs. 3 and 5, one of the diaphragm plates is carried by the cross-bar, $f^2$, the second diaphragm plate being carried by it, so that the cumulative movements of both are communicated to the rod, $f^8$. Rotation of the yoke $f$ in its threaded supporting arm, $e^4$, by moving the diaphragms bodily towards or from the bell crank, $f^9$, furnishes a quick means for adjusting the mechanism connecting the diaphragms with the valve $c^9$ to compensate for adjustment of the diaphragms in the yoke or to vary the action of the valve in response to any movement of the diaphragm plates. The arm $e^4$ is split at its end and its divided or split portions held firmly together by a friction screw, $f^{20}$, so that the said yoke and the diaphragms carried by it are held frictionally in any radiative or adjustive positions into which they are moved. It will be noticed that the connections between the diaphragm and the valve, $c^9$, are exposed and accessible. This is of value since before starting the vehicle the operator, by placing his finger upon the horizontal arm of the bell crank, $f^9$, or by means of a string, $s$, leading from a point near the seat to said bell crank may vibrate said bell crank and thereby move the valve stem, $e^6$, vertically against the action of its spring to make sure that the same is free to control the valve under the action of the diaphragm when steam is gotten up and the vehicle is in use. This accessibility of the connecting mechanism for preliminary testing independently of the diaphragm regulator is of great value in practice; for should the mechanism stick at any point, and refuse to respond to the control of the diaphragm, much inconvenience would be encountered when upon the road.

Referring to Figs. 3 and 5, it will be noticed that the torch mixing tube, $h$, and the mixing tubes, $D^2$, that lead to the mixing chambers of the burner, have a pronounced incline upwards with curved deflecting walls, $d^{2\times}$, at their ends where they enter the mixing chambers, so that when starting the burner or at any time if the jet devices should project any quantity of liquid fuel into the tubes, such fuel would strike the deflecting walls, $d^{2\times}$, and have its velocity so much reduced thereby that it would immediately gravitate down the bottoms of the tubes and drop out therefrom at their entrance ends, instead of entering the mixed chambers and collecting therein and in the said tubes and sooner or later taking fire, as would be the case were such mixing tubes in whole or in part substantially horizontal, as heretofore commonly made and with no means provided for breaking the velocity of entering liquid to prevent it reaching the mixing chamber or chambers. It is important that the diameters or cross sectional areas of these mixing tubes be ample, not only to admit the required quantity of air for the best combustion, but also to prevent the discharge from the tips from acting like injectors to impel any liquid fuel upwardly along the tubes and into the burner. The apparatus is also so constructed that any liquid fuel thus gravitating downwardly and out of the lower ends of the mixing tube may fall to the ground, for should it be permitted to collect in or upon any adjacent part of the apparatus, it would quickly ignite with damage to the apparatus and the machine.

I have already referred to the uniform distribution of gas obtained within the mixing chambers D, D by delivering the gas there-into as described. Another advantage due to such an arrangement of a plurality of jet devices in connection with the separated mixing chambers is that should any mishap make it necessary to close one of the jet devices, $c^{11}$, the other and its half of the burner may still be used, so that the vehicle is not rendered entirely helpless.

My invention is not limited to the particular apparatus, either in whole or in part, here shown and described: for example, the diaphragm regulator here described, is but one form of regulator that may be employed for the apparatus, this regulator, its connecting mechanism and suggested modifications thereof being disclosed and claimed in another application filed as a divisional hereof May 20, 1901, Serial No. 61,012.

Having described one embodiment of my invention, and without limiting myself as to details, what I claim and desire to secure by Letters Patent, is:—

1. In an apparatus of the class described, one or more mixing chambers having curved side walls and top and bottom plates, air supply tubes leading through said chambers and plates, an inlet conduit for each mixing chamber entering the latter adjacent and approximately tangentially to the curved side wall thereof arranged to project its supply through the bottom plate and towards the top plate of its chamber.

2. In an apparatus of the class described, one or more mixing chambers having laterally converging side walls and top and bottom plates, air supply tubes leading through said chambers and plates, an inlet conduit for each mixing chamber arranged to project its supply through the bottom plate and towards the top plate of its chamber and at a point near the peripheral wall thereof to deflect the supply in the direction of convergence of said side walls.

3. In an apparatus of the class described, one or more mixing chambers having laterally converging side walls and top and bottom plates, air supply tubes leading through said chambers and plates, an inlet conduit for each mixing chamber arranged to project its supply through the bottom plate and towards the top plate of its chamber at a point substantially unobstructed by said air supply tubes to deflect the supply in the direction of convergence of said side walls.

4. In a burner of the class described, a plurality of mixing chambers each provided with burner devices including one or more exit openings having a central air supply, fuel supply conduits for said chambers, each chamber being provided in the immediate vicinity of the delivery ends of said conduits with a series of small exit openings of much greater length than diameter, to operate as described, the entrance of each fuel supply conduit into its mixing chamber being in a space free from burner devices.

5. In a burner of the class described, a mixing chamber provided with burner devices including one or more exit openings having a central air supply, a fuel supply conduit for said chamber, said chamber being provided in the immediate vicinity of the delivery end of said conduit with a series of small openings of much greater length than diameter, the entrance of each fuel supply conduit into its mixing chamber being in a space free from burner devices.

6. In a burner of the class described, top and bottom plates inclosing between them one or more mixing chambers, a fuel supply conduit or conduits for each mixing chamber, the top plate in the vicinity of the delivery end of said conduit being provided with a series of perforations of considerable length in comparison with their diameter, and with other distributed exits also for the mixing chamber.

7. In a burner of the class described, the top and bottom plates inclosing between them one or more mixing chambers provided with conduits and having a series of exit openings for the contained gas, and an air supply arranged contiguous to each, the said top plate being thickened in the vicinity of the delivery ends of said conduits, and provided thereat with a series of small perforations, the length of which greatly exceeds the diameter, to operate as described.

8. In a burner of the class described, a retort longitudinally arranged in close proximity to said burner and to receive heat therefrom and subject to expansion transversely said burner, inlet and outlet connections for said retort, said connections passing through said burner, one of said connections being free of said burner and the other fixedly attached thereto, for the purpose described.

9. In a burner of the class described, a vaporizing retort arranged in close proximity to the burner, a jet device connected with the retort consisting of a body provided with fuel supply passages, a jet orifice leading therefrom, and means to introduce a heating medium within said body to heat the latter, said means extending to a point close to said jet orifices to preliminarily heat the same.

10. In a burner of the class described, a vaporizing retort arranged in close proximity to the burner, a jet device connected with the retort, consisting of a body provided with fuel supply passages and jet orifices leading therefrom and means to introduce a heating medium within said body to heat the latter.

11. In a burner of the class described, a jet orifice having a fuel supply conduit provided at its ends with jet orifices and with an additional torch orifice, and a heating conduit adjacent the fuel supply conduit traversing the length of said jet device and making a loop to a point near the said torch orifice.

12. A burner of the class described, containing top and bottom apertured plates, the bottom plate having its apertured openings flanged, air tubes fitted within the flanges in the bottom plate and connecting corresponding apertures in said plates and reinforcing rings surrounding said flanges.

In testimony whereof, I have signed my name to this specification, in the presence of two subscribing witnesses.

GEORGE E. WHITNEY.

Witnesses:
FREDERICK L. EMERY,
A. E. CHESLEY.